United States Patent [19]

Gaetani

[11] Patent Number: 5,722,504
[45] Date of Patent: Mar. 3, 1998

[54] FOUR-WHEELED LIFT TRUCK

[75] Inventor: Angelo Gaetani, Civitanova Marche, Italy

[73] Assignee: Carer S.n.c. dell'Ing. Angelo Gaetani & C., Cotignola, Italy

[21] Appl. No.: 639,063

[22] Filed: Apr. 24, 1996

[30] Foreign Application Priority Data

May 3, 1995 [IT] Italy ........................ BO95A0196

[51] Int. Cl.$^6$ ........................................ B62D 9/00
[52] U.S. Cl. .................. 180/411; 280/6.11; 280/98
[58] Field of Search ................... 280/6.11, 98, 112.2; 180/411

[56] References Cited

U.S. PATENT DOCUMENTS

| | | | |
|---|---|---|---|
| 3,086,786 | 4/1963 | Tuczek | 280/6.11 |
| 3,556,241 | 1/1971 | Mitchell | 180/411 |
| 3,933,218 | 1/1976 | Oler et al. | 180/411 |
| 4,263,979 | 4/1981 | Sturgill | 180/411 |
| 4,534,575 | 8/1985 | Grove et al. | 280/6.11 |
| 4,823,899 | 4/1989 | Ron | 180/411 |
| 5,325,935 | 7/1994 | Hirooka et al. | 180/411 X |

FOREIGN PATENT DOCUMENTS 2234214  1/1991  United Kingdom ............. 280/98

*Primary Examiner*—Christopher P. Ellis
*Attorney, Agent, or Firm*—Guido Modiano; Albert Josif

[57] ABSTRACT

The four-wheeled lift truck has a tight turning radius and improved stability, and is of the type having front wheels with independent powerplants. The rear turning wheels are mounted below the stems of respective hydraulic jacks that have vertical axes and are rigidly coupled to the chassis of the truck. The hydraulic circuits of the jacks are connected to one another, so that the lowering of one wheel is matched by a rise of the other. The stems of the jacks are interconnected by an articulation mechanism which mutually coordinates the turning angles of the wheels to move the maximum turning center to the intersection between the fixed axis of the front driving wheels and the centerline plane of the truck.

7 Claims, 6 Drawing Sheets

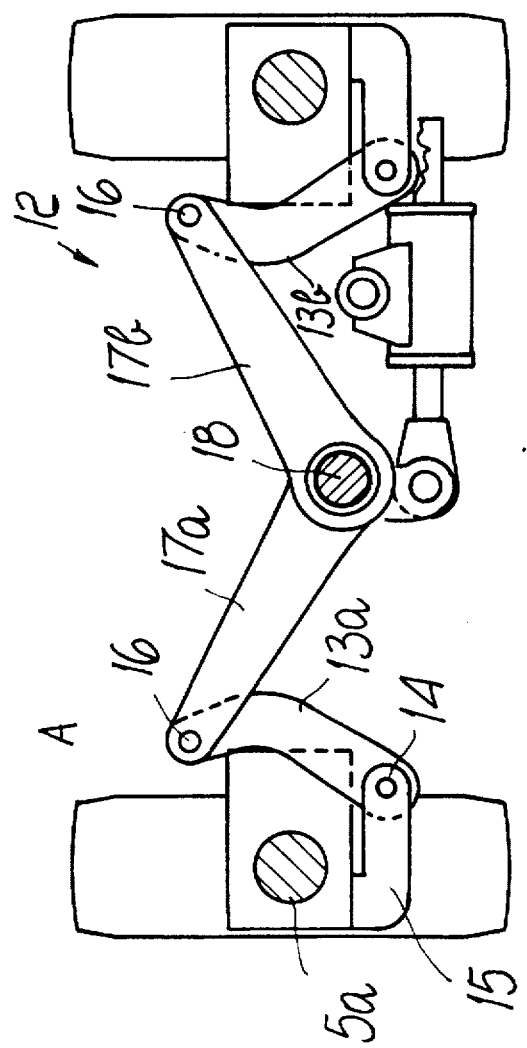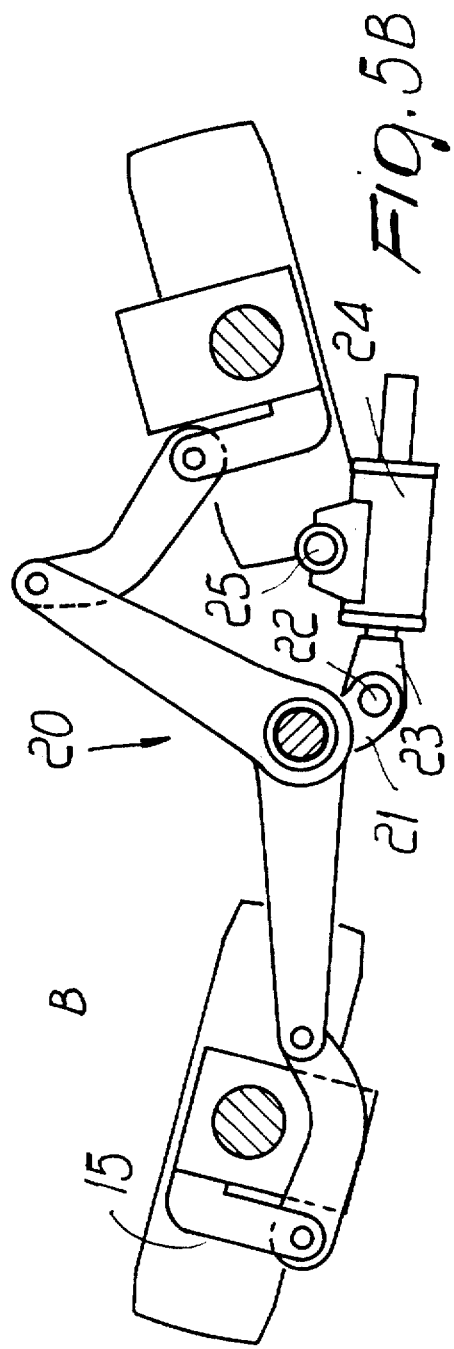

FOUR-WHEELED LIFT TRUCK

BACKGROUND OF THE INVENTION

The present invention relates to a four-wheeled lift truck with tight turning radius and improved stability.

Conventional lift trucks consist of three-or four-wheeled vehicles that are driven electrically or by internal combustion and have, in a front position, two horizontal forks that are movable vertically to lift loads. Such trucks are also known as fork-lift trucks.

Lift trucks, regardless of their power source, can have various appearances according to the type of drive, i.e., front wheel drive or rear wheel drive, and also according to the number of wheels.

So-called "three-wheeled" trucks can have a front-wheel drive (by means of a differential system or independent reduction units) or a rear-wheel drive.

In this latter case, the rear wheel, which is usually a single one, assumes the driving function in addition to the steering function; motion is transmitted thereto by a motor by means of an appropriate reduction unit. Since the two front wheels are of the freewheeling type, they can rotate freely with speeds and directions that match the turning angle of the rear wheel; accordingly, the center of rotation of the truck thus composed is always located, during maximum turning, on the point of intersection between the common axis of the front wheels and the longitudinal centerline plane of the machine.

From the point of view of stability, the truck rests on the ground according to a triangle having corners or angles defined by the locations of the three wheels.

The main drawback of this construction is that since the transmission of the torque to the ground is dependent on the vertical load that acts on the rear driving wheel, in the case of travel with a load on the forks, since the load on the rear wheel decreases, there is a loss of grip of said rear wheel; this phenomenon can cause problems when driving the truck on slippery surfaces (for example, due to the presence of water, etcetera).

One known type of front-drive three-wheeled truck, provided with motion transmission through a differential, has become obsolete because it has a turning radius that is comparable to that of a four-wheeled truck. Front-drive three-wheeled trucks, are now exclusively provided with independent driving wheels, each wheel being driven by a motor with a corresponding reduction unit. The two drive motors, when they are of the electric type, are controlled electronically as regards speed and direction of rotation but always according to the turning angle of the rear turning wheels. If the electronic control system is capable of actuating the reverse rotation of the inner driving wheel, upon maximum turning the center of rotation again lies at the intersection between the common axis of the front driving wheels and the centerline of the truck, as in the rear-drive three-wheeled truck, but without the problems of grip on the driving wheels when passing from the unloaded condition to the loaded condition.

The rear turning wheel is very often of the twin type, i.e., composed of two wheels that are coupled at a short distance from each other; this offers an advantage from the point of view of stability, since the truck rests on the ground along a trapezoid having corners or angles defined by the locations of the four wheels.

In four-wheel lift trucks, traction is instead always provided on the front wheels by means of a differential.

During turning, the inner front driving wheel tends to slow down (since it is forced to cover a path having a smaller radius than the outer wheel) until it stops in the extreme case.

Accordingly, the turning center, which lies on the fixed axis connecting the front wheels, can vary from a lateral position at infinity, in which the turning wheels are straight, to a position which coincides at the most with the ground resting point of one of the front wheels (the motionless wheel) when the turning wheels assume the maximum angle.

Turning, as mentioned, is determined by the rear wheels. Rotation of the rear wheels must be coordinated with one another and with the two front wheels to avoid slippage; in particular, for every turning radius the inner turning wheel must rotate through a greater angle than the outer wheel.

To prevent the truck from possibly resting only on three wheels, becoming unbalanced, in case of travel over uneven surfaces, the turning axle (i.e., the two turning wheels and the unit for coordinated transmission of rotation about the respective vertical axes) can be oscillatably mounted with respect to a horizontal axis lying on the longitudinal centerline plane of the truck; however, with this solution, from the point of view of stability, the truck rests on the ground only apparently along the rectangle having corners defined at the ground resting points of the wheels, since actually, for the purpose of stability, the resting base is constituted by the triangle the corners whereof lie in the ground resting points of the front wheels and in the point about which the turning unit is articulated to the truck about the horizontal axis; this makes the truck more unstable, since (in the case of considerable loads lifted to a great height or for fast and tight curves) the center of gravity of the truck-load system can easy fall outside the ground resting triangle, causing the lateral overturning of the system.

SUMMARY OF THE INVENTION

A principal aim of the present invention is to obviate the above-mentioned drawbacks of known types, by providing a four-wheeled lift truck with a tight turning radius and improved stability, in which the center of rotation shifts to the intersection between the centerline of the truck and the axis of the front wheels, and which has improved stability, and wherein the ground-resting polygon remains a rectangle or an isosceles trapezoid having corners lying in the ground resting points of the wheels, this being achieved even on uneven ground.

Within the scope of this aim, an object of the present invention is to achieve the above aim with a structure that is simple, relatively easy to manufacture in practice, safe in use, effective in operation, and has relatively low cost.

With this aim and this object in view, there is provided a four-wheeled lift truck as defined in the appended claims.

The truck according to the invention has a tight turning radius and improved stability, and is provided with front wheels having independent powerplants, rear turning wheels mounted below the stems of respective hydraulic jacks having vertical axes and rigidly coupled to the chassis of the truck, the hydraulic circuits of said jacks being connected to each other so that the lowering of one wheel is matched by a rise of the other wheel. The stems of said jacks are interconnected by articulation means adapted to mutually coordinate the turning angles of said wheels to move the maximum turning center to the intersection between the fixed axis of the front driving wheels and the centerline plane of the truck.

BRIEF DESCRIPTION OF THE DRAWINGS

Further characteristics and advantages of the present invention will become apparent from the following detailed description of a preferred but not exclusive embodiment of a four-wheeled lift truck with tight turning radius and improved stability according to the invention, illustrated only by way of non-limitative example in the accompanying drawings, wherein:

FIG. 5A is a plan view of the turning wheels of the truck, shown in a straight-wheel configuration;

FIG. 5B is a plan view of the turning wheels of the truck shown in a maximum turning condition;

DESCRIPTION OF THE PREFERRED EMBODIMENTS

Figure 1A:
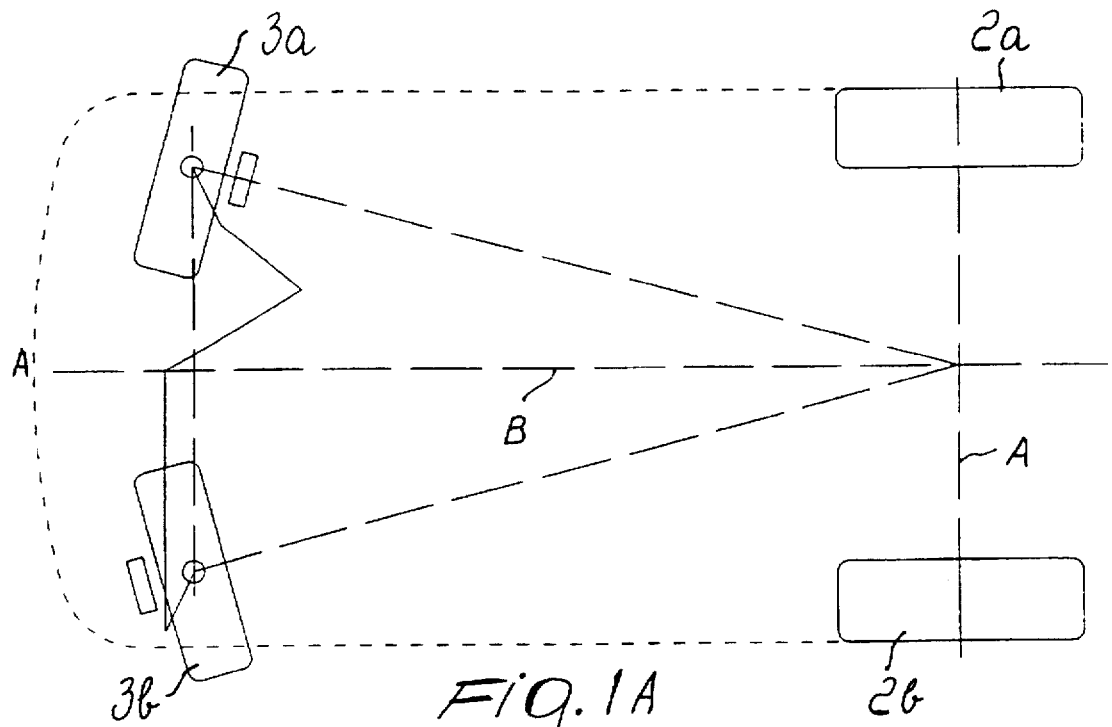
FIG. 1A is a schematic plan view of a four-wheeled lift truck with tight turning radius and improved stability according to the invention, shown in the maximum turning condition.
Figure 1B:
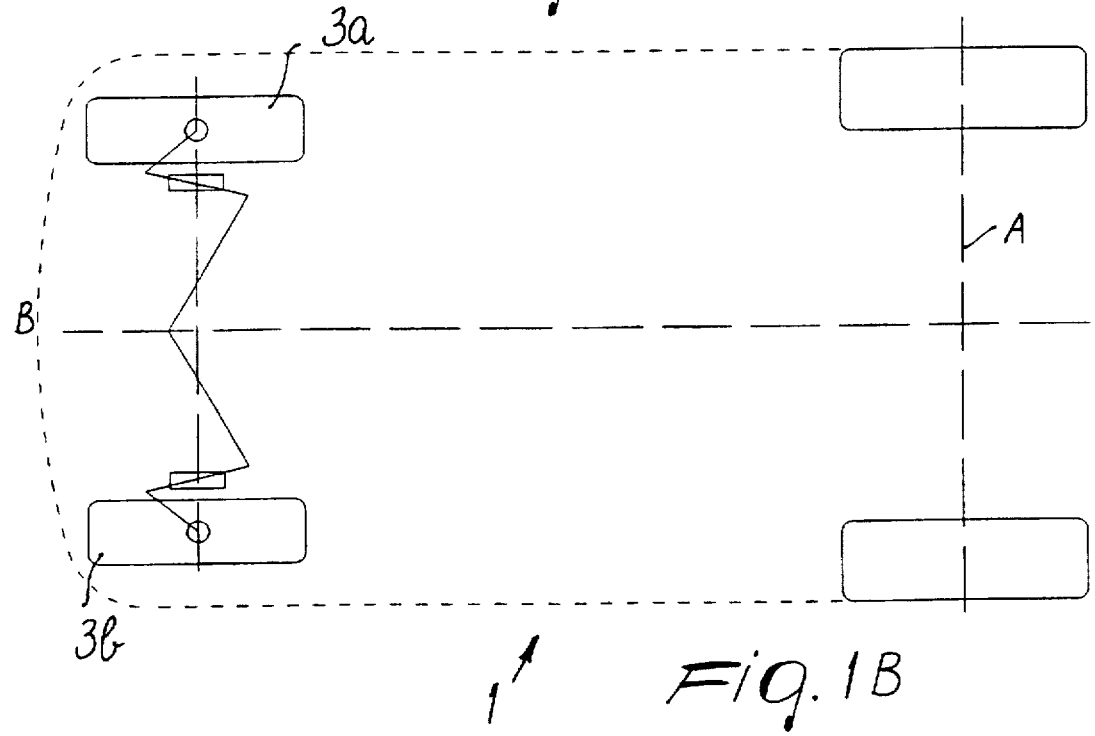
FIG. 1B is a schematic plan view of the lift truck of FIG. 1A, shown in the straight-wheel condition.
Figure 2A:
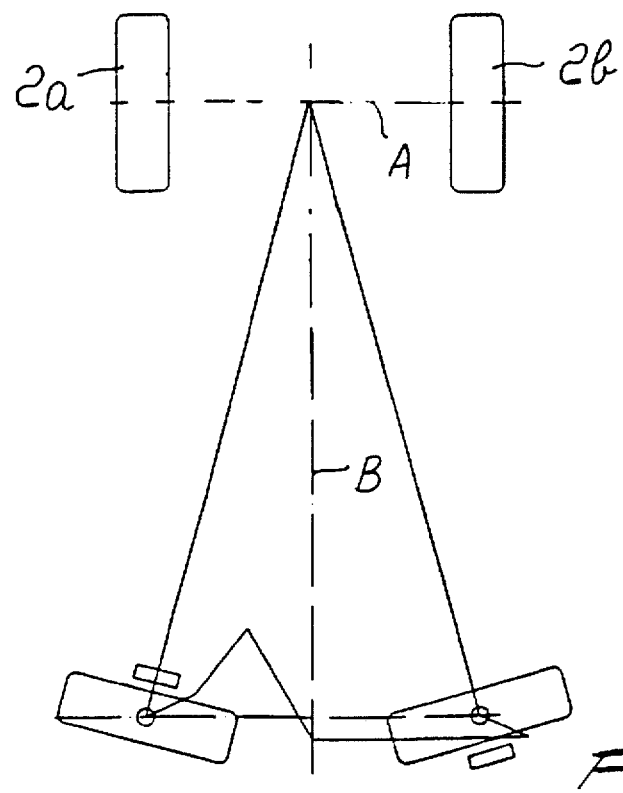
FIG. 2A is a schematic plan view of the lift truck according to the invention, shown in a configuration for negotiating a tight turning radius, similar to that shown in FIG. 1A.
Figure 2B:
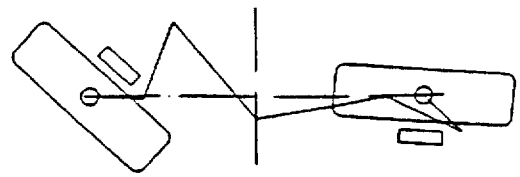
FIG. 2B is a schematic plan view of a lift truck according to the invention, shown in a configuration for negotiating a greater turning radius than the truck illustrated in FIG. 2A.
Figure 2C:
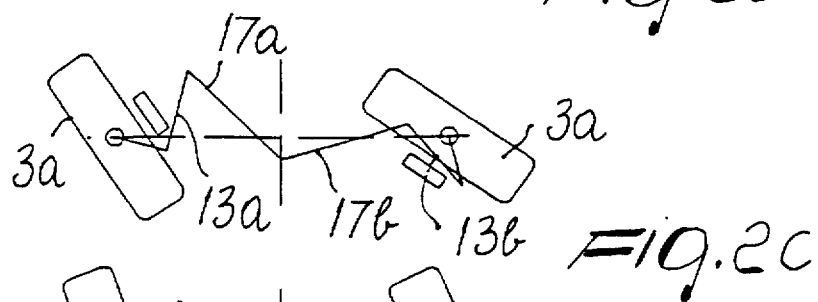
FIG. 2C is a schematic plan view of the lift truck illustrated in FIGS. 2A and 2B, shown in a configuration for negotiating a greater turning radius than the truck illustrated in FIG. 2B.
Figure 2D:
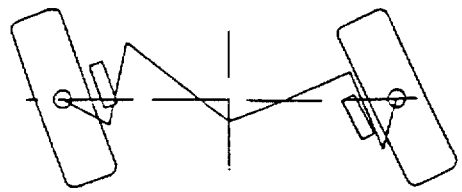
FIG. 2D is a schematic plan view of the lift truck illustrated in FIGS. 2A–2C, shown in a configuration for negotiating a greater turning radius than the truck illustrated in FIG. 2C.
Figure 2E:
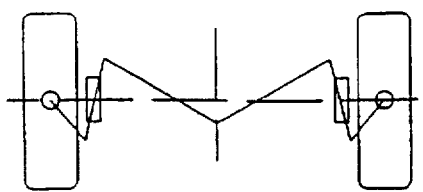
FIG. 2E is a schematic plan view of the lift truck illustrated in FIGS. 2A–2D, shown in a straight-wheel configuration for linear travel, similar to the truck illustrated in FIG. 1B.

With particular reference to the above figures, the reference numeral 1 generally designates a four-wheeled lift truck with tight turning radius and improved stability according to the invention. The truck 1, which has a wheelbase as shown schematically by dashed lines in FIG. 1, is of the type in which the front wheels 2a and 2b have independent powerplants and a fixed axis represented by the line A; the centerline plane of the truck has been indicated schematically by the line B.

The reference numerals 3a and 3b designate the rear turning wheels of the truck, which are mounted by means of respective brackets 4 below the stems 5a and 5b of respective hydraulic jacks 6a and 6b having vertical axes and supported by supports 7 that are rigidly coupled to the chassis of the truck.

Schematically, each one of the stems 5 is provided with a piston 8 rigidly coupled thereto and slideable hermetically in a chamber that is delimited at the top and at the bottom by two heads 9 and 10; proximate to the heads 9, the two jacks 6a and 6b are connected to the ends of a duct 11a so that their hydraulic circuits are connected to one another; in this manner, the lowering of one wheel, for example in the presence of a hole, is matched by a lifting of the other wheel, which partially compensates it.

The duct 11a can be advantageously connected to an hydraulic accumulator, preloaded at an appropriate pressure, the purpose whereof is to cushion the dynamic impacts of the rear wheels against any ground unevennesses, producing a shock-absorbing effect.

Proximate to the heads 10, the jacks are connected to two respective ducts 11b, which can be connected to each other or to the discharge (drain ducts).

The stems 5a and 5b are interconnected by articulation means, generally designated by the reference numeral 12 (FIG. 4), which are adapted to mutually coordinate the turning angles of the wheels to move the turning center to the intersection between the fixed axis A of the front driving wheels and the centerline plane of the truck, indicated by the line B.

The means 12 comprise two linkages 13a, 13b (FIG. 5) that are articulated about vertical axes, with one of their respective ends, by means of pivots 14, to two arms 15 which are rigidly coupled to the stems 5 and with articulation eyelets located in eccentric positions with respect to said stems.

The linkages are articulated, with their other ends, by means of pivots 16, to the ends of two crank-like levers 17a and 17b that are rigidly coupled together, since they are coupled by means of a spline to a vertical pivot 18 arranged on the centerline plane of the truck.

The pivot 18, which is mounted at its ends on two supports 19a and 19b that are fixed to the chassis of the truck (FIG. 4), is connected to means for rotary actuation in opposite directions, generally designated by the reference numeral 20, for right or left turning.

The means 20 can be advantageously constituted by a link 21 that is fixed radially to the pivot 18; the stem 23 of a hydraulic jack 24 is pivoted by means of a pivot 22 to the end of said link; said jack 24 is articulated, by means of a pivot 25, to the chassis of the truck; instead of the stem 23 and of the jack 24, it is possible to install a system with a worm screw and a nut that is actuated so as to rotate in opposite directions.

Figure 4:
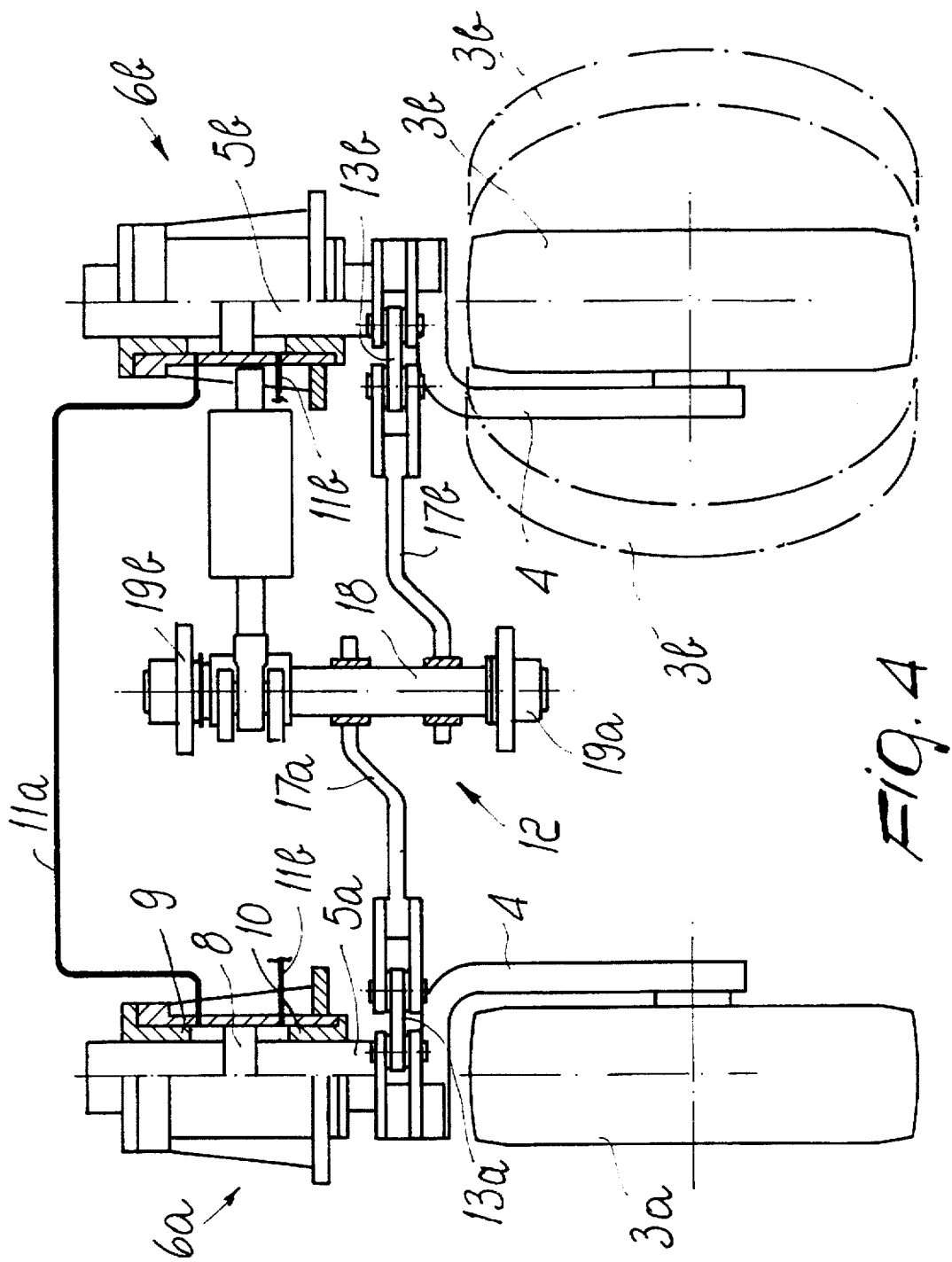
FIG. 4 is a partially sectional front view of the two turning wheels of the truck according to the invention.

In order to compensate for the relative lifting and lowering of the arms 15, of the linkages 13, and of the levers 17 due to the mutually opposite vertical sliding movements of the stems 5, the levers 17 are slideable vertically on the pivot 18, as shown in FIG. 4, or the levers 18 and the linkages 13 or the linkages 13 and the arms 15 are slideable vertically with respect to each other; finally, each one of the levers 17 might also be produced in two parts, with an end portion that oscillates about substantially horizontal axes.

Advantageously, the power sources of the powerplants of the front wheels are provided with control means that are coordinated with the rotation angles of the turning wheels to assume, by virtue of a differentiated rotation rate, the same turning center and avoid slippage of the wheels.

FIG. 2 illustrates, in successive positions, the configurations gradually assumed by the rear wheels to move from a condition in which the turning center is at infinity to a condition in which the turning center is on the centerline plane of the truck (the wheels 2a and 2b rotate in opposite directions).

It is thus evident that the invention achieves the intended aim and object, and in particular that it allows tight turning radii and vertical movements of the turning wheels to compensate for unevennesses in the ground, as well as to maintain the coincidence between the ground resting polygon and the rectangle, the corners whereof are located at the four wheels.

The invention thus conceived is susceptible to numerous modifications and variations, all of which are within the scope of the inventive concept in relation, for example, to the components that are adapted to mutually coordinate the turning angles of the two wheels 3a and 3b and to produce their movement.

Figure 6:
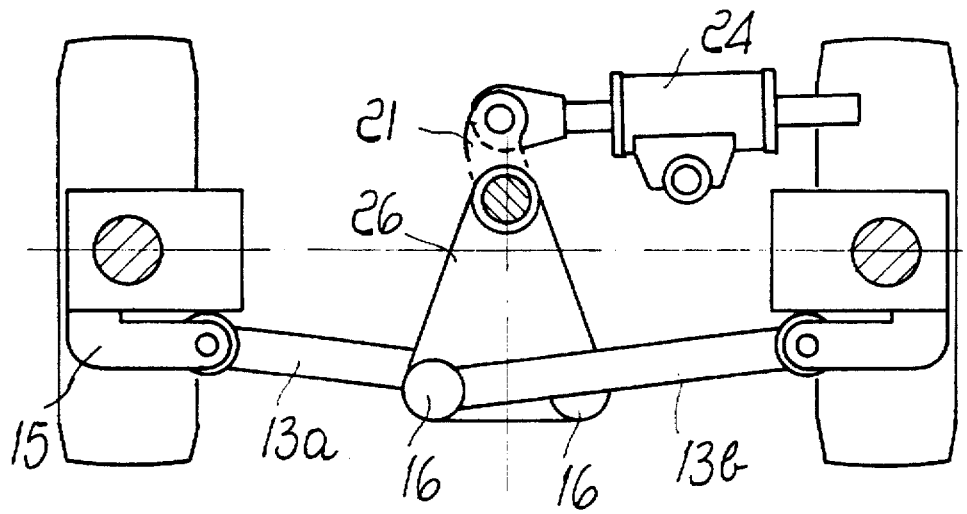
FIG. 6 is a plan view of an alternative embodiment of the articulation means of the turning wheels.

In addition to the above described system, the following variations can be hypothesized:

A system with crossed arms, shown schematically in FIG. 6, in which the linkages 13a and 13b cross and are articulated about vertical axes to respective pivots 16 that are formed, in an interchanged configuration, in a triangular link 26.

The jack 24 again acts on the link 21 that is rigidly coupled to the link 26.

Figure 7:
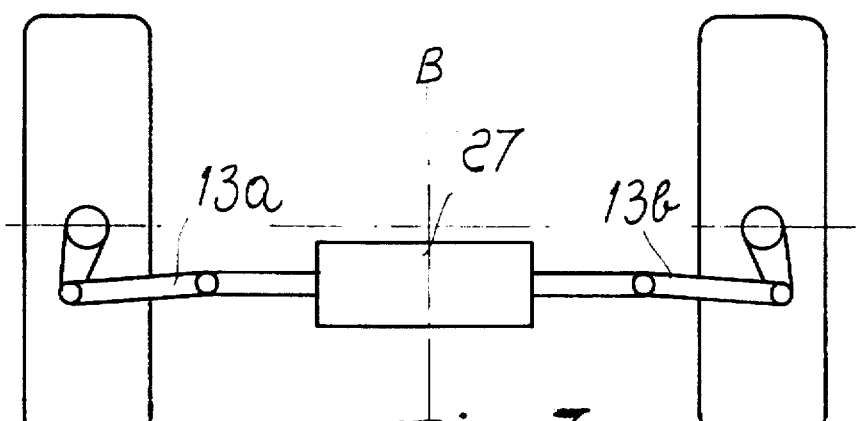
FIG. 7 is a plan view of another alternative embodiment of the articulation means of the turning wheels.

A system with a single central jack, see FIG. 7, in which the turning motion is imparted to the wheels by a hydraulic jack 27 the axis whereof is parallel to the rear axis and is offset with respect to said axis and symmetrical to the centerline plane B of the truck.

The stem of the jack 27, which is advantageously of the double-action type, is coupled directly to the linkages 13a and 13b by means of pivots having a vertical axis; the jack is connected to the frame so that it can oscillate freely to follow the vertical movements of the wheels.

Figure 8:
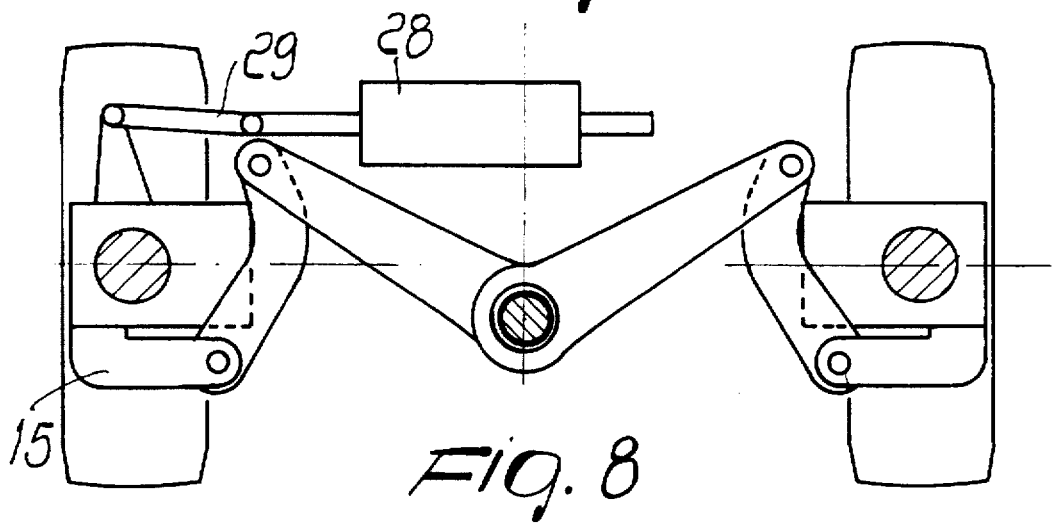
FIG. 8 is a plan view of another alternative embodiment of the articulation means of the turning wheels.

A motor that acts on a single wheel. The turning motion can be transmitted directly to one wheel and can be generated by an electric or hydraulic motor or even by a single-action jack 28, as shown in FIG. 8, which acts on one of the two turning wheels by means of an appropriate gear reduction unit or a linkage 29; motion is then transmitted to the other wheel by means of a set of articulated arms similar to those described above.

A system with independent wheels, constituted by two electric or hydraulic motors, each whereof acts on a wheel by means of an appropriate reduction unit; the coordination of the angles between the two turning wheels occurs by means of a respectively electronic or hydraulic intelligent system capable of controlling the angle degree by degree, adjusting the speeds and rotational directions of the motors according to the power source of the powerplants of the front driving wheels.

Figure 3:
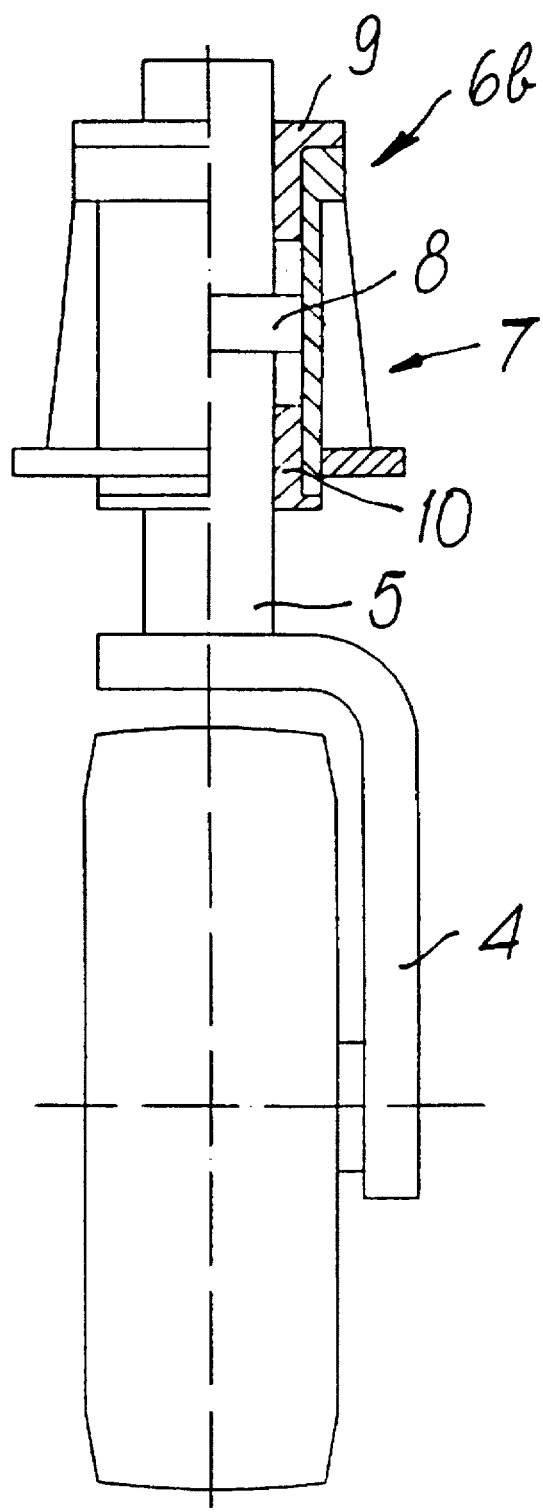
FIG. 3 is a partially sectional front view of a turning wheel of the truck.

Finally, the five systems described heretofore can be provided by acting either on the stems 5 that protrude in the lower part of the jacks 6, as shown in FIGS. 3 and 4, or on the same stems that protrude in the upper part.

All the details may furthermore be replaced with other technically equivalent ones.

In practice, the materials employed, as well as the shapes and the dimensions, may be any according to the requirements without thereby abandoning the scope of the protection of the appended claims.

What is claimed is:

1. Four-wheeled lift truck of the type having front wheels with independent powerplants, comprising rear turning wheels mounted below the stems of respective hydraulic jacks that have substantially vertical axes and are rigidly coupled to the chassis of the truck, the hydraulic circuits of said jacks being connected to one another so that the lowering of one wheel is matched by a rise of the other wheel, further comprising stems of said jacks that are interconnected by articulation means adapted to mutually coordinate the turning angles of said wheels to move the maximum turning center to the intersection between the fixed axis of the front driving wheels and the centerline plane of the truck.

2. Truck according to claim 1, wherein said articulation means comprise two linkages that are articulated to the stems of said jacks about vertical axes, with one end, in eccentric positions, and with their other ends to the ends of two crank-like levers that are mutually rigidly coupled and are associated with a vertical pivot arranged on the centerline plane of the truck and connected to means for rotary actuation, in opposite directions, for turning to the right or to the left.

3. Truck according to claim 1, wherein said articulation means comprise two elongated linkages that cross and are articulated, about vertical axes, with one end, in positions that are eccentric with respect to the stems of said jacks and, with their other ends, to the two symmetrical pivots of a triangular link that is associated with a vertical pivot arranged on the centerline plane of the truck and connected to means for rotary actuation in opposite directions for right or left turning.

4. Truck according to claim 1, wherein said articulation means comprise two linkages that are articulated about vertical axes, with one end, in eccentric positions, to the stems of said jacks and, with their other ends, to the ends that are opposite and symmetrical, with respect to the centerline plane of the truck, of the stem of a double-action hydraulic jack arranged parallel to the rear axle of the truck.

5. Truck according to claim 1, wherein said articulation means comprise two linkages that are articulated about vertical axes, with one end, in positions that are eccentric with respect to the stems of said jacks and, with their other ends, to the ends of two crank-like levers that are mutually rigidly coupled and are associated with a vertical pivot that is arranged on the centerline plane of the truck, one of said turning wheels being connected to means for rotary actuation in opposite directions for right or left turning.

6. Truck according to claim 1, wherein said articulation means are mechanically independent of each other and are connected electronically or hydraulically to the power sources of the front driving wheels to coordinate their respective turning angles.

7. Truck according to claim 1, wherein means are provided for controlling the power source of the powerplants of said front wheels, said means being coordinated with the rotation angles of the turning wheels to assume the same turning center.

* * * * *